(No Model.)

J. F. FOLMER.
GLAND FOR SURFACE CONDENSER TUBES.

No. 277,557. Patented May 15, 1883.

WITNESSES:
Geo. B. Collier
Geo. F. Kelly

INVENTOR
John F. Folmer,
by Collier & Bell,
attys.

UNITED STATES PATENT OFFICE.

JOHN F. FOLMER, OF PHILADELPHIA, PENNSYLVANIA.

GLAND FOR SURFACE-CONDENSER TUBES.

SPECIFICATION forming part of Letters Patent No. 277,557, dated May 15, 1883.

Application filed February 1, 1883. (No model.)

*To all whom it may concern:*

Be it known that I, JOHN F. FOLMER, of the city and county of Philadelphia, in the State of Pennsylvania, have invented a certain new and useful Improvement in Glands for Surface-Condenser Tubes, of which improvement the following is a specification.

The object of my invention is to provide simple, effective, and inexpensive means for securing the tubes of surface-condensers in position, and preventing the creeping or undue longitudinal movement of the tubes, while permitting such limited amount of end movement as may be necessary to allow for contraction and expansion.

To this end my improvement consists in a gland having two or more internal projections acting as stops to limit the end movement of the tube which the gland secures, and also as abutments for the application of a wrench in screwing the gland into position in the tube-sheet, as hereinafter more fully set forth.

Figure 1:
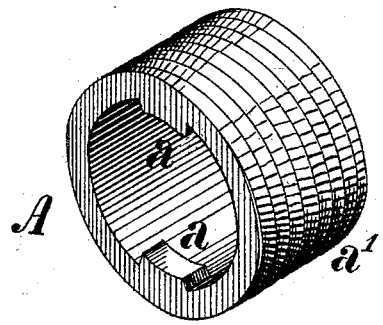
Figure 2:
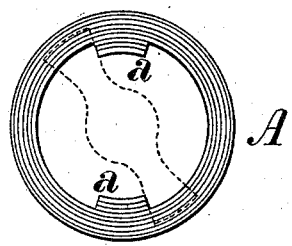
Figure 3:
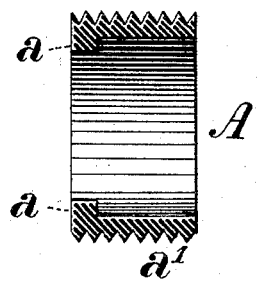
Figure 4:
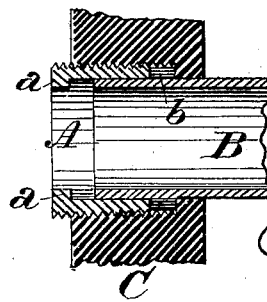

In the accompanying drawings, Figure 1 is an isometrical view of a gland for surface-condenser tubes embodying my invention; Fig. 2, an end view; Fig. 3, a longitudinal central section of the same, and Fig. 4 a section through a surface-condenser-tube sheet, showing the gland, tube, and packing.

To carry out my invention, I cast, in brass or other suitable metal, an annular gland, A, the internal diameter of which is such as to permit of the easy insertion of the tube which it is designed to secure. At or adjacent to one end of the gland I form thereon, preferably by casting in a single piece with its body, two or more lugs, stops, or internal projections, a, the inner ends of which act as stops to prevent the displacement of the tube B by excessive end motion, while permitting a proper and limited degree thereof, and the sides of which serve as bearings or abutments for the application of a wrench to screw the gland to or remove it from its desired position in the tube-sheet C, which it engages by an external thread, a', the packing b being compressed around the tube between the inner end of the gland and the bottom of the recess in the tube-sheet.

The dotted lines in Fig. 2 illustrate the relation of the wrench to the projections, its action being exerted upon surfaces which are substantially radial to the axis of the gland, or parallel to radii thereof.

My improvement effects a substantial economy by reducing to a minimum the weight and cost of the gland, as the projections a need be but of small size, and no machine-work whatever, except the cutting of the ordinary outside thread, is required. Moreover, its use entails the important additional advantage of enabling collared or beaded tubes to be dispensed with and ordinary plain tubes to be satisfactorily employed.

I am aware that ends or thimbles used for connecting tubes to tube-sheets and having a squared opening for the insertion of a wrench, as in the patents of B. H. Bartol, No. 18,669, November 24, 1857, and J. V. V. Booraem, No. 40,013, September 22, 1863, are not new, and such construction I do not claim, my improvement having been devised with the special object of avoiding the disadvantages of glands of the above class, which are greater weight and cost, increased diameter, involving the necessity of placing the tubes farther apart, greater resistance to the passage of water, and reduced strength due to the absence of metal at the angles of the opening and the action of the wrench upon the faces thereof.

I am further aware that a gland having an annular interior thickened flange to prevent end movement of a tube, and a transverse slot for the insertion of a screw-driver, is not new. Such construction, which is illustrated in the patent of J. S. Wilson, No. 221,435, November 11, 1879, necessitates a greater weight of metal and further machine-work than does my invention, and involves greater resistance to the passage of water, and such I hereby distinctly disclaim.

I claim as my invention and desire to secure by Letters Patent—

A gland for surface-condenser tubes having a cylindrical opening throughout its length, provided with two or more internal lugs or projections at or adjacent to one of its ends, the inner ends of said projections being adapted to serve as stops to limit, without completely preventing, the end movement of a condenser-tube, and their sides as bearings for the application of a wrench to screw the gland into or unscrew it from a tube-sheet, substantially as set forth.

JOHN F. FOLMER.

Witnesses:
JOHN J. TERNAN,
MATHIAS SEDDINGER.